(12) United States Patent
Miller et al.

(10) Patent No.: US 9,156,702 B2
(45) Date of Patent: Oct. 13, 2015

(54) GRAPHENE MEMBRANE REPAIR

(75) Inventors: Seth Adrian Miller, Englewood, CO (US); Gary L. Duerksen, Ward, CO (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/809,049

(22) PCT Filed: Jul. 25, 2012

(86) PCT No.: PCT/US2012/048154
§ 371 (c)(1),
(2), (4) Date: Jan. 8, 2013

(87) PCT Pub. No.: WO2014/018031
PCT Pub. Date: Jan. 30, 2014

(65) Prior Publication Data
US 2014/0030482 A1  Jan. 30, 2014

(51) Int. Cl.
*C01B 31/04* (2006.01)
*B01D 69/12* (2006.01)
*B01D 71/02* (2006.01)
*B05D 3/00* (2006.01)
*B01D 65/10* (2006.01)
*B01D 69/10* (2006.01)
*B82Y 30/00* (2011.01)
*B82Y 40/00* (2011.01)

(52) U.S. Cl.
CPC .......... *C01B 31/0484* (2013.01); *B01D 65/108* (2013.01); *B01D 69/10* (2013.01); *B01D 71/021* (2013.01); *B05D 3/007* (2013.01); *B82Y 30/00* (2013.01); *B82Y 40/00* (2013.01); *B05D 2259/00* (2013.01); *Y10T 428/24339* (2015.01)

(58) Field of Classification Search
None
See application file for complete search history.

(56) References Cited

U.S. PATENT DOCUMENTS

| | | | |
|---|---|---|---|
| 4,602,922 A | 7/1986 | Cabasso | |
| 4,664,669 A | 5/1987 | Ohyabu | |
| 4,741,829 A | 5/1988 | Takemura | |
| 4,863,496 A | 9/1989 | Ekiner et al. | |
| 5,045,354 A | 9/1991 | Feimer | |
| 5,091,216 A | 2/1992 | Ekiner et al. | |
| 5,702,503 A | 12/1997 | Tang | |
| 5,710,187 A | 1/1998 | Steckler | |
| 6,409,921 B1 | 6/2002 | Muller | |
| 6,442,144 B1 | 8/2002 | Hansen et al. | |
| 6,730,145 B1 | 5/2004 | Li | |
| 7,846,738 B2 | 12/2010 | Golovchenko et al. | |
| 7,947,114 B2 | 5/2011 | Hagg et al. | |
| 8,546,785 B2 | 10/2013 | Yang et al. | |
| 8,551,650 B2 | 10/2013 | Kung et al. | |
| 2006/0003458 A1 | 1/2006 | Golovchenko et al. | |
| 2010/0096595 A1 | 4/2010 | Prud'Homme et al. | |
| 2010/0178464 A1 | 7/2010 | Choi et al. | |
| 2011/0017390 A1 | 1/2011 | Blake et al. | |
| 2011/0017587 A1 | 1/2011 | Zhamu et al. | |
| 2011/0201201 A1 | 8/2011 | Arnold et al. | |
| 2011/0240947 A1 | 10/2011 | Yang et al. | |
| 2011/0240951 A1 | 10/2011 | Yang et al. | |
| 2012/0000845 A1 | 1/2012 | Park et al. | |
| 2012/0148829 A1* | 6/2012 | Krogman et al. | .......... 428/319.3 |
| 2013/0052489 A1 | 2/2013 | Zhamu et al. | |
| 2013/0059174 A1 | 3/2013 | Zhamu | |
| 2013/0162216 A1 | 6/2013 | Zhamu et al. | |
| 2013/0186758 A1 | 7/2013 | Saha et al. | |
| 2013/0192461 A1 | 8/2013 | Miller et al. | |
| 2013/0202945 A1 | 8/2013 | Zhamu et al. | |
| 2013/0270188 A1 | 10/2013 | Karnik et al. | |
| 2014/0107326 A1 | 4/2014 | Swager et al. | |
| 2014/0183133 A1 | 7/2014 | Anderson et al. | |

FOREIGN PATENT DOCUMENTS

| | | |
|---|---|---|
| CN | 101558457 A | 10/2009 |
| CN | 101774575 A | 7/2010 |
| CN | 101831633 A | 9/2010 |
| CN | 101983758 A | 3/2011 |
| CN | 102316964 A | 1/2012 |
| EP | 2138222 A1 | 12/2009 |
| WO | WO2007017650 A1 | 2/2007 |

(Continued)

OTHER PUBLICATIONS

"Functionalized Polymers," Polymer Source, accessed at http://www.polymersource.com/product.php?ID=689, accessed on Aug. 8, 2014, p. 1.

(Continued)

*Primary Examiner* — William Phillip Fletcher, III
(74) *Attorney, Agent, or Firm* — Moritt Hock & Hamroff LLP; Steven S. Rubin, Esq.

(57) ABSTRACT

Technologies described herein are generally related to systems and processes for repairing a graphene membrane on a support. A chamber may receive a layer of graphene on a support. The layer of graphene may include a hole. A first container including an initiator may be effective to apply an initiator through the hole to the support to functionalize the support and produce an initiator layer on the support. A second container including an activator may be effective to apply an activator through the hole to the initiator layer to activate the initiator layer. The application of the activator may further be effective to grow a polymer from the initiator layer. The growth of the polymer may be effective to produce a polymer plug in the hole and effective to repair at least a portion of the layer of graphene.

10 Claims, 7 Drawing Sheets

(56) References Cited

FOREIGN PATENT DOCUMENTS

| WO | WO2011094204 A2 | 8/2011 |
|----|----|----|
| WO | 2011150325 A2 | 12/2011 |
| WO | 2012005857 A1 | 1/2012 |

OTHER PUBLICATIONS

"Nitrine," Wikipedia, accessed at https://web.archive.org/web/20090609015900/http://en.wikipedia.org/wiki/Nitrene, Last modified on May 20, 2009, pp. 1-4.

"Thin Film Composite Membrane," Wikipedia, accessed at https://web.archive.org/web/20120401025219/http://en.wikipedia.org/wiki/Thin_film_composite_membrane, Last modified on Mar. 24, 2012, pp. 1-3.

Bekyarova, E., et al., "Chemical Modification of Epitaxial Graphene: Spontaneous Grafting of Aryl Groups," J. Am. Chem. Soc., 2009, pp. 1336-1337, vol. 131, Issue 4.

Blankenburg, S., et al., "Porous Graphene as an Atmospheric Nanofilter," Wiley-VCH Verlag GmbH & Co. KGaA, Oct. 18, 2010, pp. 2266-2271, vol. 6, No. 20.

Bunch, J. S., et al., "Impermeable Atomic Membranes from Graphene Sheets," Nano Lett., 2008, pp. 2458-2462, vol. 8, No. 8.

Choi, J., et al., "Covalent Functionalization of Epitaxial Graphene by Azidotrimethylsilane," J. Phys. Chem. C, 2009, pp. 9433-9435, vol. 113, No. 22.

Deng, Z. W., and Souda, R., "Dissociative thermal-electron attachment at a surface: CN-emission from nitrogen ion irradiated graphite," Surface Science, 2001, pp. 393-398, vol. 488, Issue 3.

Hong, M., et al., "Hydrogen purification using a SAPO-34 membrane," Journal of Membrane Science, 2008, pp. 277-283, vol. 307, Issue 2.

International Search Report and Written Opinion for International Application No. PCT/US12/22798, mailed Jun. 22, 2012, 10 pages.

Koehler, F. M., et al., "Permanent Pattern-Resolved Adjustment of the Surface Potential of Graphene-Like Carbon through Chemical Functionalization," Angew. Chem. Int. Ed. 2009, pp. 224-227, vol. 48, Issue 1.

Lee, S. H., et al., "Polymer Brushes via Controlled, Surface-Initiated Atom Transfer Radical Polymerization (ATRP) from Graphene Oxide," Macromolecular Rapid Communications, 2010, pp. 281-288, vol. 31, Issue 3.

Liu, L.-H., and Yan, M., "A Simple Method for the Covalent Immobilization of Graphene," Nano Lett., 2009, pp. 3375-3378, vol. 9, No. 9.

Liu, S.-L., et al., "Preparation and Property of Some Azidosilanes," Chemistry Research Center, National Taiwan University, Taipei Taiwan, 1970, pp. 229-234, vol. 17, Issue 4.

Molbur, J. C., and Doctor, R. D., "Hydrogen from Steam-Methane Reforming with CO2 Capture," 20th Annual International Pittsburgh Coal Conference, 2003, pp. 1-21.

Salavagione, H. J., et al., "Recent Advances in the Covalent Modification of Graphene with Polymers," Macromolecular Rapid Communications, 2011, pp. 1771-1789, vol. 32, Issue 22.

Warner, D. L., et al., "N-Silyl Protecting Groups for Labile Aziridines: Application toward the Synthesis of N-H Aziridinomitosenes," J. Org. Chem., 2007, pp. 8519-8522, vol. 72, Issue 22.

Jiang, D. et al., Porous Graphene as the Ultimate Membrane for Gas Separation, Nano Lett., 2009, 4019-4024, 9 (12).

Schrier, J., Helium Separation Using Porous Graphene Membranes, J. Phys. Chem. Lett., 2010, 2284-2287, 1 (15).

Henis, J.M.S. & Tripod!, M.K., A Novel Approach to Gas Separation Using Composite Hollow Fibre Membranes, Separation Science and Technology, 1980, 1059, 15.

Li, X. et al., Transfer of Large-Area Graphene Films for High-Performance Transparent Conductive Electrodes, Nano Letters, 2009, 4359-4363, vol. 9.

Unarunotai, S. et al., Transfer of graphene layers grown on SiC wafers to other substrates and their integration into field effect transistors, 2009 Appl. Phys. Lett., 3 pages. 95.

Patole, A. S. et al., A facile approach to the fabbrication of graphene/polystyrene nanocomposite by in situ microemulsion polymerization, Journal of Colloid and Interface Science, 2010, 530-537, 350.

Saufi, S. M. & Ismail, A. F., Fabrication of carbon membranes for gas separation—a review, Carbon, 2004, 241-259, 42.

Zhang, M. et al., Production of Graphene Sheets by Direct Dispersion with Aromatic Healing Agents, Small, May 2010, 1 page.

Steenackers, M. et al., Polymer Brushes on Graphene, Journal of American Chemical Society, 2011, 10490-10498, 133 (27).

Chen, R. et al., Grafting Acrylic Polymers from Flat Nickel and Copper Surfaces by Surface-Initiated Atom Transfer Radical Polymerization, Langmuir, 2008, 6889-6896, 24 (13).

Regan, W. et al., A direct transfer of layer-area graphene, Appl. Phys. Lett., 2010, 3 pages, 96.

Lee, Y. et al., Wafer-scale Synthesis and Transfer of Graphene Films, Nano Lett., 2010, 490-493, 10.

International Search Report and Written Opinion for application with application No. PCT/US2012/048146, dated Oct. 5, 2012, 8 pages.

International Search Report and Written Opinion for application with application No. PCT/US2012/048154, dated Oct. 5, 2012, 10 pages.

\* cited by examiner

GRAPHENE MEMBRANE REPAIR

CROSS REFERENCE TO RELATED APPLICATIONS

This application is a U.S National Stage filing under 35 U.S.C. §371 of International Application No. PCT/US2012/048154 filed on Jul. 25, 2012, the entirety of which is hereby incorporated by reference. The present application is related to the following application: PCT Patent Application No. PCT/US2012/048146, entitled "REPAIRING GRAPHENE ON A POROUS SUPPORT" naming Seth Miller and Gary Duerksen as inventors, filed Jul. 25, 2012, which is currently co-pending.

BACKGROUND

Unless otherwise indicated herein, the materials described in this section are not prior art to the claims in this application and are not admitted to be prior art by inclusion in this section.

Graphene is a material that generally may include a one atom thick layer of bonded carbon atoms. Graphene may be formed by growing carbon atoms on top of another material such as copper. The copper may be inserted into a quartz tube, heated, and annealed. A gas mixture of $CH_4$ and $H_2$ may then be flowed into the tube and the copper may then be cooled with flowing $H_2$ to form graphene.

SUMMARY

In some examples, a method for repairing graphene is generally described. Some example methods may include receiving, by a chamber, a layer of graphene on a support. The layer of graphene may include a hole. The method may include applying an initiator through the hole to the support. The application of the initiator may be effective to functionalize the support and produce an initiator layer on the support. The method may further include applying an activator through the hole to the initiator layer. The application of the activator may be effective to activate the initiator layer. The method may further include growing a polymer from the initiator layer using the activator. The growth of the polymer may be effective to produce a polymer plug in the hole.

In some examples, a system effective to repair a layer of graphene including a hole is generally described. Some example systems may include a chamber, a first container and/or a second container. The chamber may be effective to receive the layer of graphene on a support. The first container may be in operative relationship with the chamber. The first container may include an initiator. The second container may be in operative relationship with the chamber. The second container may include an activator. The chamber may be configured effective to operate with the first container to apply the initiator through the at least one hole to the support to functionalize the support and to produce an initiator layer on the support. The chamber may further be configured to operate with the second container to apply the activator through the at least one hole to the initiator layer to activate the initiator layer. The chamber may be configured to operate with the second container to grow a polymer from the initiator layer using the activator to produce a polymer plug in the at least one hole.

In some examples a structure is generally described. Example structures may include a support. The structure may further include a layer of graphene on the support. The layer of graphene may include at least one hole region. The structure may further include a polymer plug in the at least one hole region.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
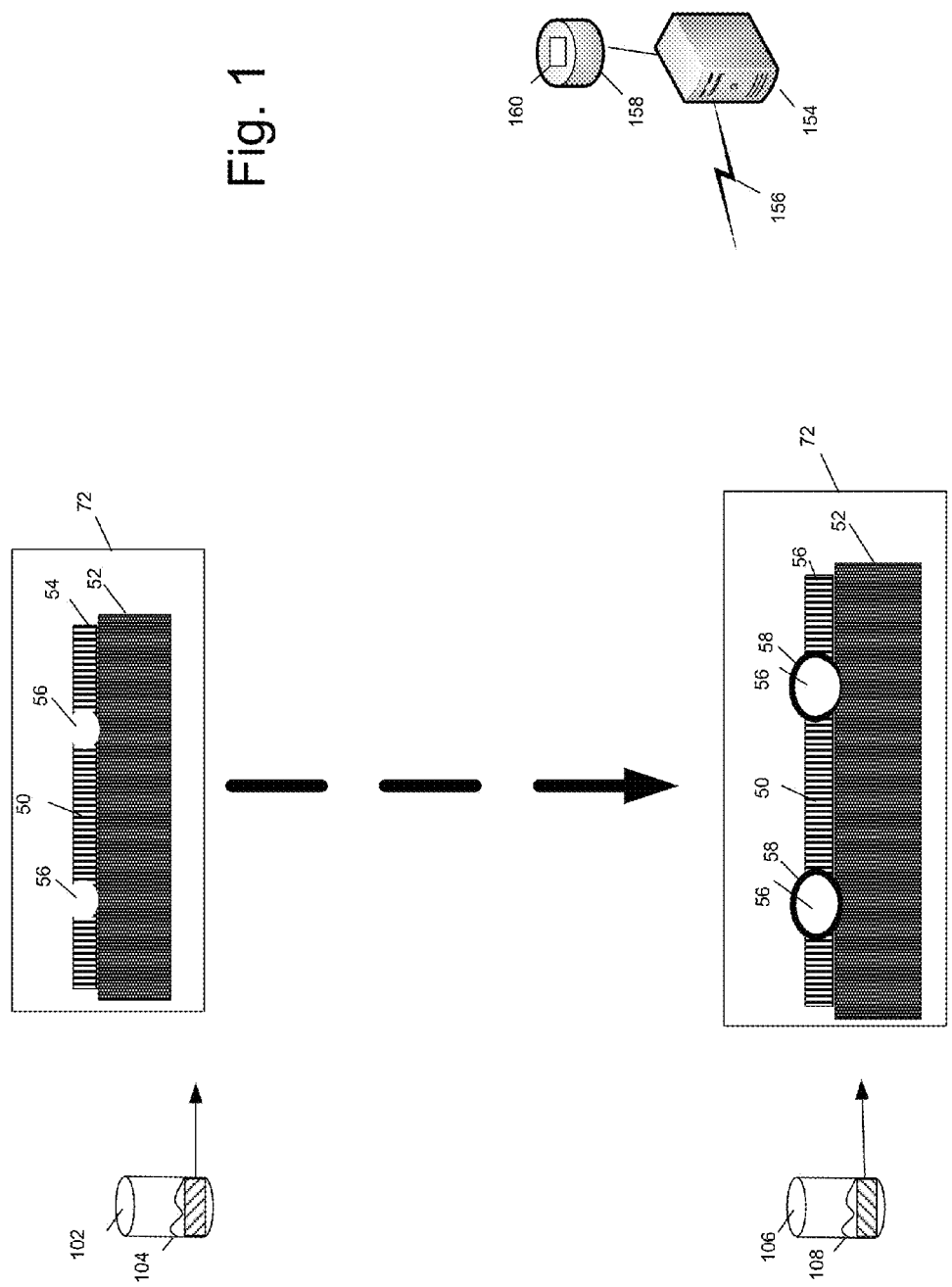
FIG. 1 illustrates an example system that can be utilized to implement repair of a graphene membrane on a support.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to systems, methods, materials and apparatus related to repairing a graphene membrane on a support.

Briefly stated, technologies are generally described related to systems and processes for repairing a graphene membrane on a support. A chamber may receive a layer of graphene on a support. The layer of graphene may include a hole. A first container including an initiator may be effective to apply an initiator through the hole to the support to functionalize the support and produce an initiator layer on the support. A second container including an activator may be effective to apply an activator through the hole to the initiator layer to activate the initiator layer. The application of the activator may further be effective to grow a polymer from the initiator layer. The growth of the polymer may be effective to produce a polymer plug in the hole and effective to repair at least a portion of the layer of graphene.

It will be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

FIG. 1 illustrates an example system that can be utilized to implement repair of a graphene membrane on a support arranged in accordance with at least some embodiments described herein. An example graphene membrane repair system 100 may include one or more of a first container 102, a second container 106, a support 52, a graphene membrane or graphene layer 54 and/or a chamber 72 all configured in operative relationship with respect to one another. At least some of elements of graphene membrane repair system 100 may be arranged in communication with a processor 154 through a communication link 156. In some examples, processor 154 may be adapted in communication with a memory 158 that may include instructions 160 stored therein. Processor 154 may be configured, such as by instructions 160, to control at least some of the operations/actions/functions described below.

As discussed in more detail below, graphene membrane 54 may include desired pores 50 and undesired holes 56 or defects. Desired pores 50 may be formed through patterning to create molecule sized holes. Desired pores 50 may be, for example, about 1 Å to about 1 nm in length or diameter. In an example, desired pores 50 may be generally unaffected by application of a graphene membrane repair process discussed herein. Undesired holes 56 may be between about 1 nm and about 5 nm in length or diameter. First container 102 may be configured to operate with chamber 72 to apply an initiator material 104 on support 52. Initiator material 104 may be less reactive to graphene membrane 54 and more reactive to support 52 where holes 56 are present. Second container may be configured to operate with chamber 72 to apply a material 108 to activate initiator material 104 resulting in localized polymerization around undesired holes 56. Activation of initiator material 104 may generate polymer plugs 58. Polymer plugs 58 may effectively close or substantially plug undesired holes 56.

Figure 2:
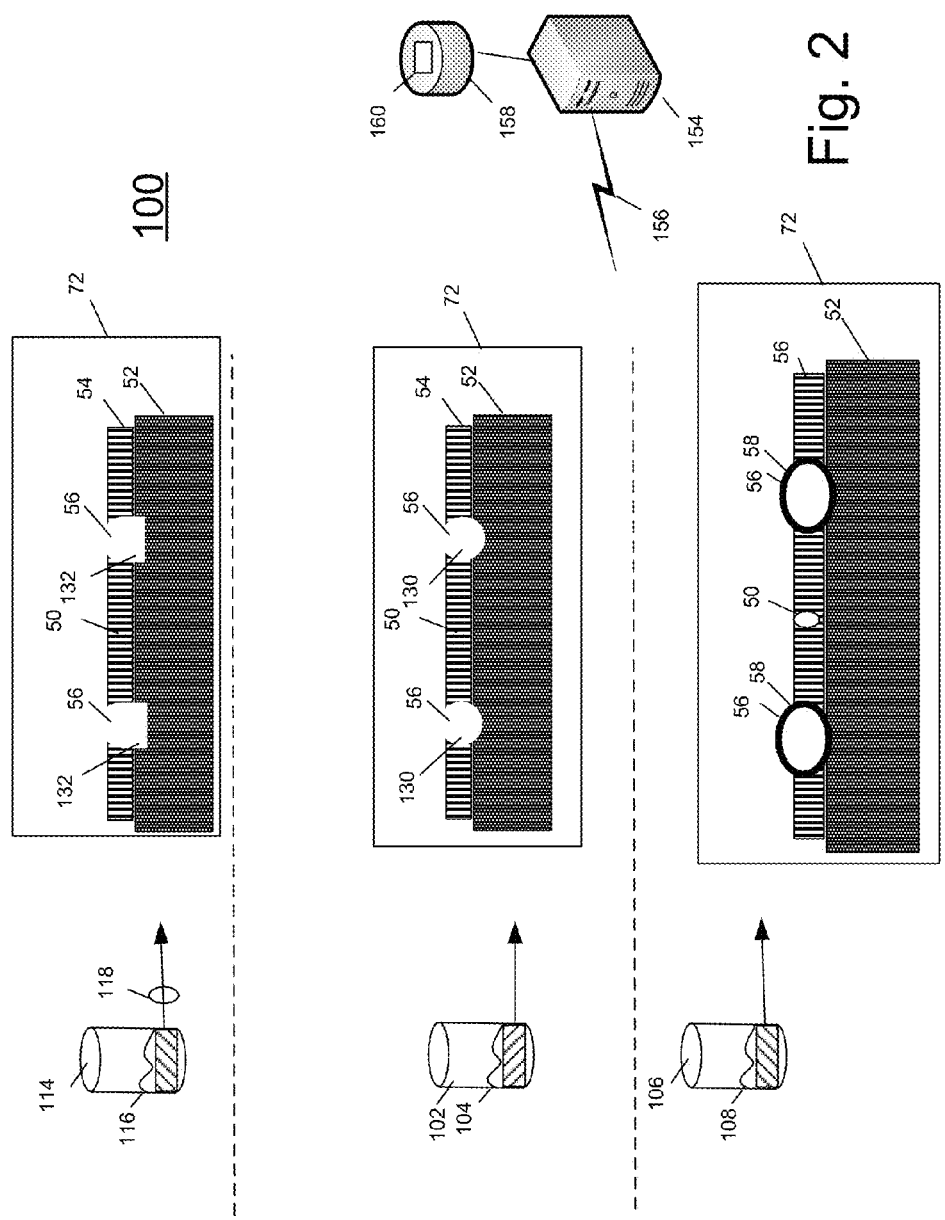
FIG. 2 illustrates an example system that can be utilized to implement repair of a graphene membrane on a support.

FIG. 2 illustrates an example system that can be utilized to implement repair of a graphene membrane on a support arranged in accordance with at least some embodiments described herein. FIG. 2 is substantially similar to system 100, with additional details. Those components in FIG. 2 that are labeled identically to components of FIG. 1 will not be described again for the purposes of clarity.

System 100 may include a container 114 arranged in operative relationship with chamber 72. Container 114 may include a material 116 and a port 118. Support 52 may be treated, such as with an etching process, to generate a cutout region 132 near undesired holes 56. For example, processor 154 may control the actuation of port 118 to open or close and selectively allow material 116 to be applied through membrane 54 and on to support 52 through undesired holes 56. Material 108 may include iron chloride such as a solution including about 0.01 g/ml to about 0.1 g/ml of iron chloride in water. Material 116 may be applied to support 52 for a time interval of about 2 minutes to about 10 minutes. Cutout region 132 may allow for polymer plug 58 to substantially anchor to both a bottom and a top side of membrane 54 thereby improving adhesion.

Figure 3:
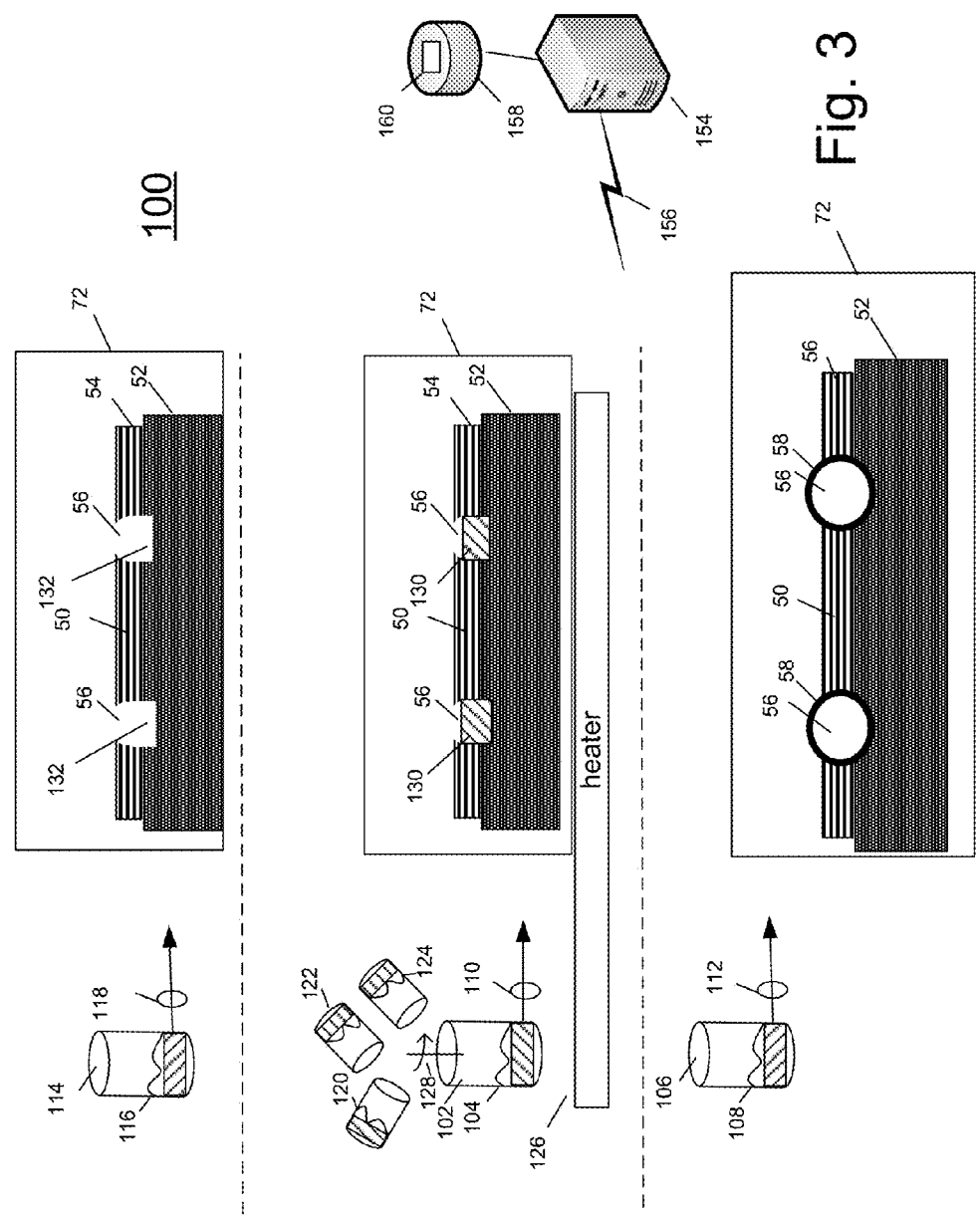
FIG. 3 illustrates an example system that can be utilized to implement repair of a graphene membrane on a support.

FIG. 3 illustrates an example system that can be utilized to implement repair of a graphene membrane on a support arranged in accordance with at least some embodiments described herein. FIG. 3 is substantially similar to system 100, with additional details. Those components in FIG. 3 that are labeled identically to components of FIGS. 1 and 2 will not be described again for the purposes of clarity.

Support 52 may be made of a material effective to support graphene membrane 54. For example, support 52 may be made of copper, nickel, silica, alumina, a polymer, etc. Initiator material 104 may be effective to functionalize support 52 so that a polymer may be grown on support 52 at locations where holes 56 are present. In locations where graphene or pores 50 are present, initiator 104 may have difficulty functionalizing support 52. Initiator material 104 may be a material effective to initiate a polymerization process on support 52. Initiator 104 may be selected to functionalize based on a material in substrate 52.

In an example, initiator material 104 may include a brominated silanol or a brominated thiol. Such an initiator may form a monolayer on support 52 and may refrain from reacting with graphene membrane 54. In an example, initiator material 104 may be formed by adding one part by volume brominated silanol 120 to 10 parts by volume methanol 122 into container 102 and stirred by a stirring device 128. Stirring device 128 may be controlled by processor 154. Stirring device 128 may stir brominated silanol 120 and methanol 122 for a time interval of about 1 minute to about 10 minutes. Thereafter, 89 parts by volume of de-ionized water 124 may be added to container 102 to create a mixture. The mixture may be stirred by stirring device 128 at a temperature in a range of about 30 degrees Celsius to about 50 degrees Celsius for a time interval in a range of about 45 minutes to about 75 minutes. Heat may be applied to container 102 by a heater 126. Thereafter, the mixture may be cooled to a temperature in a range of about 18 degrees Celsius to about 24 degrees Celsius to produce initiator material 104. Initiator material 104 may be applied to support 52 with membrane 54 such as by processor 154 controlling port 110. Initiator material 104 may attach to support 52 through holes 56 to form initiator layer 130.

Graphene membrane 54 may then be washed with methanol. For example, processor 154 may control port 110 to open and apply methanol 122 to membrane 54. Methanol 122 may wash off portions of initiator material 104 remaining on membrane 54. Membrane 54 and support 52 may then be heated to a temperature in a range of about 120 degrees Celsius to about 170 degrees Celsius by heater 126.

Figure 4:
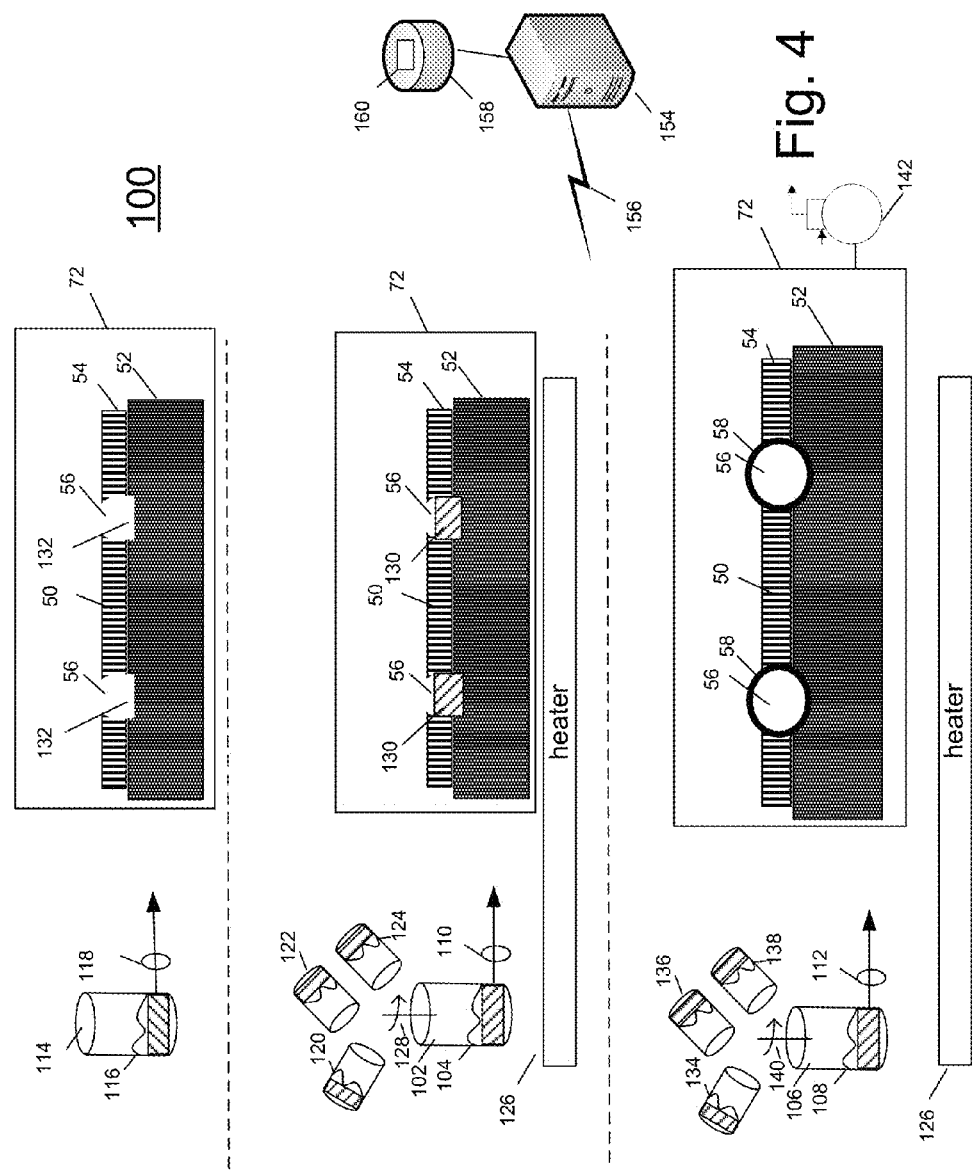
FIG. 4 illustrates an example system that can be utilized to implement repair of a graphene membrane on a support.

FIG. 4 illustrates an example system that can be utilized to implement repair of a graphene membrane on a support arranged in accordance with at least some embodiments described herein. FIG. 4 is substantially similar to system 100, with additional details. Those components in FIG. 4 that are labeled identically to components of FIG. 1-3 will not be described again for the purposes of clarity.

Initiator layer 130 may be activated by material 108 such as with a polymerization process. The activation may form polymer plugs 58. For example, polymerization may occur in regions with holes 56 of a diameter larger than a molecular size of monomers in initiator 104. In an example, polymer plug 58 may grow to a thickness and diameter of about 10 nm to about 1 µm. Polymer plug 58 may have a hemispherical shape on a top of membrane 54. Polymer plug 58 may also have a hemispherical shape on a bottom of membrane 54 when cutout regions 132 are formed.

For example an atom-transfer-radical polymerization process (ATRP) may be used to grow plug 58. In other examples, a ring opening metatheses or anionic polymerization may be used. In an example, activation material 108 may be formed by combining styrene, toluene, CuCl, CuBr$_2$, and/or bipyridine—all of which may be in one or more of containers 134, 136 or 138. For example, about 4.2 g (40 mmol) of styrene, about 4.0 g toluene, about 19.8 mg (0.20 mmol) of CuCl, about 4.9 mg (0.020 mmol) of CuBr$_2$, and about 68.6 mg (0.440 mmol) of bipyridine may be combined in container 106 to form a mixture. The mixture may be heated to a temperature of about 35 degrees Celsius to about 50 degrees Celsius in an atmosphere lacking oxygen such as less than about 0.1% oxygen. A heater 126 may be used to control a temperature in chamber 72. A pump 142 may be used to control a pressure in chamber 72.

Activation material 108 may be applied to membrane 54 and initiator layer 130. Initiator layer 130 and activation material 108 may be heated to a temperature in a range of about 30 degrees Celsius to about 50 degrees Celsius in a vacuum for a time interval in a range of about 5 minutes to about 15 minutes. Activation material 108 may activate initiator 104 to form polymer plug 58. After forming plug 58, membrane 54 may be washed with methanol, such as from one of containers 134, 136, or 138 and then dried using heat from heater 126.

Material 108 may include a species that may be polymerized by a radical process such as vinyls, styryls, acrylates, acrylamides, etc. A styrene monomer may be used, as discussed above, and a resulting polymer may have relatively strong durability and adhesion to membrane 54. Shown below is an example of the chemistry which may occur where an acrylate, such as MMA (Methyl methacrylate), is used as a monomer.

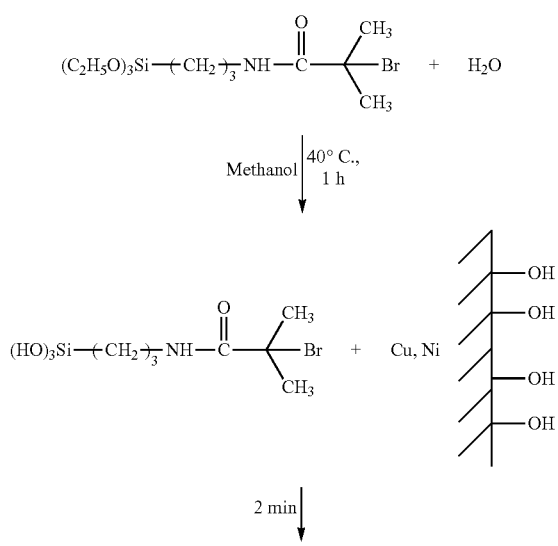

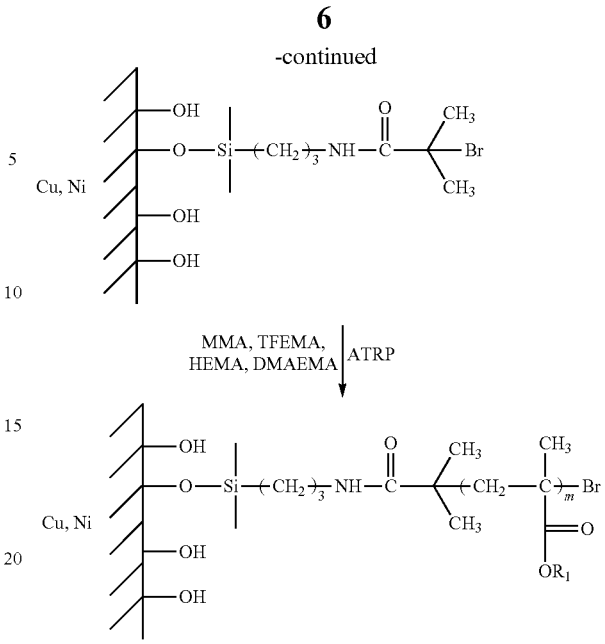

Among other potential benefits, a system arranged in accordance with the present disclosure may facilitate use of graphene membranes produced with relatively high defect counts, and perhaps made using less expensive manufacturing processes. These produced membranes may be used without sacrificing graphene's relatively higher permeability/low membrane resistance or reducing the graphene's low gas transport selectivity. Such higher defect count membranes may be repaired by plugging undesired holes. Such undesired holes may otherwise degrade the membrane's ability to sieve molecules based on size. Undesired holes may be plugged while a remainder of a membrane may still be unobstructed and used.

A graphene membrane repaired as discussed herein may be transferred to another surface. Produced polymer plugs may be robust to handle a dry or wet etching process. The etching process may remove the support and replace the support with a porous support. In a dry etching process, the described plug may maintain good adhesion to the graphene membrane. In a wet etching process, a solvent may be used and the described plug may avoid being degraded by this solvent. In an example, a polar monomer such as poly(hydroxyethylacrylate) may be used in the etching process.

Figure 5:
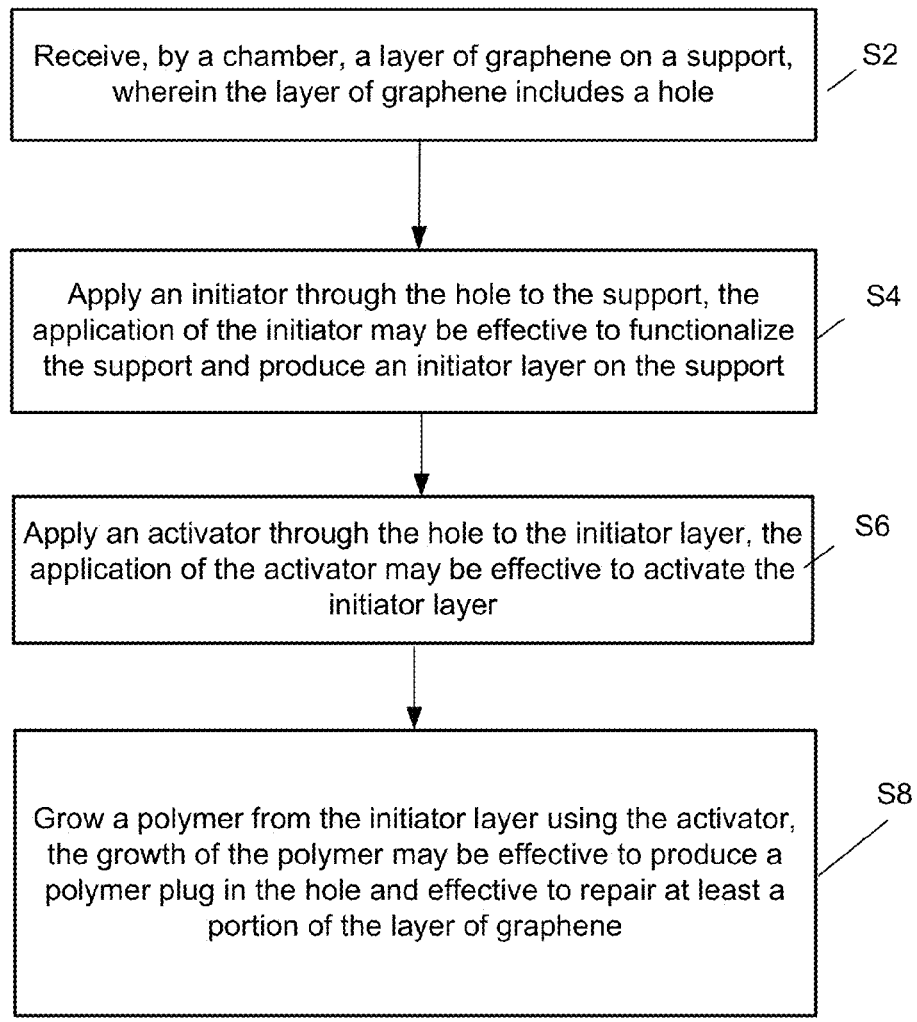
FIG. 5 depicts a flow diagram for an example process for implementing repair of a graphene membrane on a support.

FIG. 5 depicts a flow diagram for an example process 200 for implementing repair of a graphene membrane on a support in accordance with at least some embodiments described herein. The process in FIG. 5 could be implemented using, for example, system 100 discussed above. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation.

Process 200 may begin at block S2, "Receive, by a chamber, a layer of graphene on a support, wherein the layer of graphene includes a hole." At block S2, a chamber may be configured effective to receive a layer of graphene on a support. The support may be made of, for example, copper, nickel, silica, alumina, a polymer, etc.

Processing may continue from block S2 to block S4, "Apply an initiator through the hole to the support, the application of the initiator may be effective to functionalize the support and produce an initiator layer on the support." In block S4, the chamber may be configured effective to operate with a first container to apply an initiator through the hole to the support. For example, a processor may selectively control (e.g., actuate into an open or closed position) a port that is positioned between the first container and the chamber to apply the initiator from the first container to the chamber. The initiator may include, for example, a brominated silanol or a brominated thiol.

In some examples, before the application of the initiator of block S4, a cutout region may be formed in the support to receive the initiator. For example, iron chloride may be applied proximate to a cutout region on the support effective to form the cutout region in the support. After application of the initiator, the layer of graphene may be washed, such as with methanol, and dried.

Processing may continue from block S4 to block S6, "Apply an activator through the hole to the initiator layer, the application of the activator may be effective to activate the initiator layer." At block S6, the chamber may be configured effective to operate with a second container to apply an activator through the hole to the initiator layer to activate the initiator layer. For example, a processor may selectively control a port that is positioned between the first container and the chamber to apply the initiator from the first container to the chamber. The activator may include one or more of a vinyl, styryl, acrylate, and/or acrylamide.

Processing may continue from block S6 to block S8, "Grow a polymer from the initiator layer using the activator, the growth of the polymer may be effective to produce a polymer plug in the hole and effective to repair at least a portion of the layer of graphene." At block S6, the application of the activator to the initiator layer may be effective to grow a polymer from the initiator layer. The growth of the polymer may be effective to produce the polymer plug in the hole. In an example, growing the polymer may include one or more of an atom-transfer-radical polymerization, a ring opening metatheses polymerization and/or an anionic polymerization.

Figure 6:
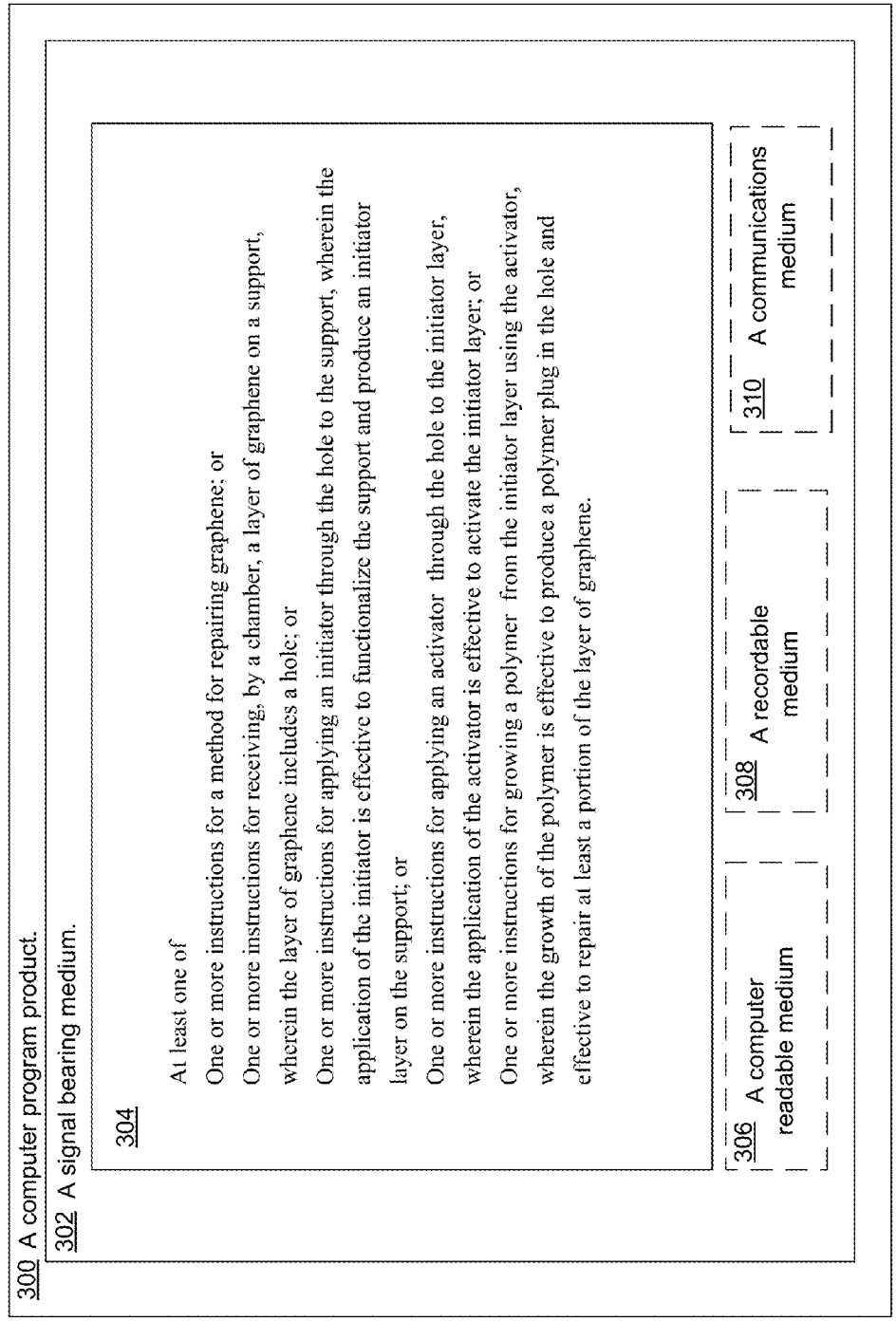
FIG. 6 illustrates a computer program product that can be utilized to implement repair of a graphene membrane on a support.

FIG. 6 illustrates a computer program product that can be utilized to implement repair of a graphene membrane on a support in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-5. Thus, for example, referring to system 100, processor 154 may undertake one or more of the blocks shown in FIG. 6 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 7:
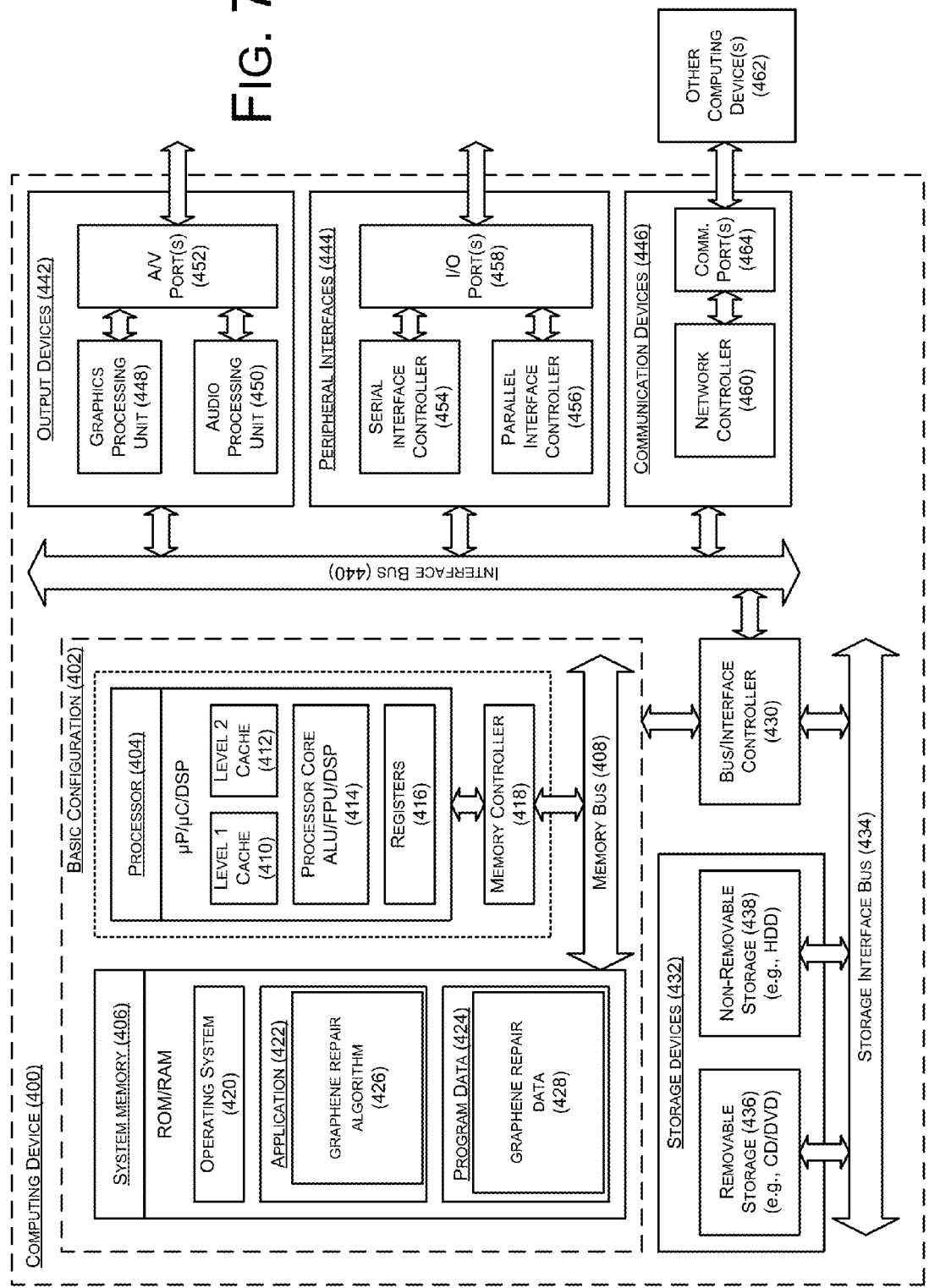
FIG. 7 is a block diagram illustrating an example computing device that is arranged to implement repair of a graphene membrane on a support; all arranged according to at least some embodiments described herein.

FIG. 7 is a block diagram illustrating an example computing device that is arranged to implement repair of a graphene membrane on a support according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor ($\mu$P), a microcontroller ($\mu$C), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a graphene repair algorithm 426 that is arranged to perform the various functions/actions/operations as described herein including at least those described with respect to system 100 of FIGS. 1-6. Program data 424 may include graphene repair data 428 that may be useful for implementing repair of a graphene membrane on a support as is described herein. In some embodiments, application 422 may be arranged to operate with program data 424 on operating system 420 such that repair of a graphene membrane on a support may be provided. This described basic configuration 402 is illustrated in FIG. 7 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for repairing graphene, the method comprising:
    receiving, by a chamber, a layer of graphene on a support, wherein the layer of graphene includes a hole;
    applying an initiator through the hole to the support, wherein the application of the initiator functionalizes the support to produce an initiator layer on the support;
    applying an activator through the hole to the initiator layer, wherein the application of the activator activates the initiator layer; and
    growing a polymer from the initiator layer using the activator, wherein the growth of the polymer produces a polymer plug in the hole.

2. The method of claim 1, wherein the initiator includes a brominated silanol or a brominated thiol.

3. The method of claim 1, further comprising forming the initiator by:
    adding about one part by volume brominated silanol to about ten parts by volume methanol into a container to form a first mixture;
    stirring the first mixture for a time interval in a first range of about one minute to about ten minutes;
    adding about eight nine parts by volume of de-ionized water to form a second mixture; and
    stirring the second mixture at a temperature in a second range of about 30 degrees Celsius to about 50 degrees Celsius for a time interval in a third range of about 45 minutes to about 75 minutes.

4. The method of claim 1, further comprising: after applying the initiator, washing the layer of graphene with methanol to remove at least some of the initiator from the layer of graphene.

5. The method of claim 1, further comprising:
    removing part of the support to form a cutout region;
    wherein the polymer plug extends above an upper surface of the layer of graphene and below a lower surface of the layer of graphene and into the cutout region of the support.

6. The method of claim 1, further comprising applying iron chloride to a region of the support effective to form a cutout region.

7. The method of claim 1, wherein the support comprises one or more of copper, nickel, silica, alumina, or a polymer.

8. The method of claim 1, wherein the activator comprises one or more of styrene, toluene, copper chloride, copper bromide, and/or bipyridine.

9. The method of claim 1, wherein growing the polymer comprises one or more of an atom-transfer-radical polymerization, a ring opening metatheses polymerization and/or an anionic polymerization.

10. The method of claim 1, wherein the activator comprises one or more of a vinyl, styryl, acrylate, and/or acrylamide.

* * * * *